United States Patent

Kuchar

[11] Patent Number: 5,867,354
[45] Date of Patent: Feb. 2, 1999

[54] DEVICE FOR DETERMINING THE TOTAL PLAYING OF A TAPE

[75] Inventor: Franz Kuchar, Vinna, Austria

[73] Assignee: U.S.Philips Corporation, New York, N.Y.

[21] Appl. No.: 541,378

[22] Filed: Oct. 10, 1995

[30] Foreign Application Priority Data

Oct. 13, 1994 [EP] European Pat. Off. ............ 94202973

[51] Int. Cl.[6] .................................................. G11B 15/18
[52] U.S. Cl. ............................ 360/137; 360/71; 242/357
[58] Field of Search .................................. 360/137, 72.3, 360/73.07, 73.01; 242/336, 344, 357

[56] References Cited

U.S. PATENT DOCUMENTS

| | | | |
|---|---|---|---|
| 4,996,611 | 2/1991 | Ito | 360/72.3 |
| 5,165,622 | 11/1992 | Arai | 360/137 |

FOREIGN PATENT DOCUMENTS

| | | |
|---|---|---|
| 0580253A2 | 1/1994 | European Pat. Off. . |
| 3049296 | 9/1981 | Germany . |

*Primary Examiner*—A. J. Heinz
*Attorney, Agent, or Firm*—Michael E. Belk

[57] ABSTRACT

A method of and a device for determining the total playing time of a magnetic tape accommodated in a cassette (1) in a magnetic-tape recording and/or reproducing apparatus, for example, a video recorder of the helical-scan type. The tape (4) is moved between a tape spool coupled to a first reel disc (2) and a tape spool coupled to a second reel disc (3), two measurements being carried out. In the first measurement, the tape is moved with a known tape speed. The revolution times ($T_l$, $T_r$) of the first and the second reel disc are measured in this first measurement and a parameter is derived which corresponds to the sum of the squares of the revolution times. A cassette-specific constant ($\beta$) is derived from this parameter and the known tape speed. In a second measurement, the revolution times of the first and the second reel disc are measured during N revolutions of one of the two reel discs for each revolution of this reel disc. For each revolution, a ratio $K(n)$ is calculated from the revolution times thus determined and the cassette-specific constant, $K(n)$ being proportional to $L(n)/L_t$ and $L_t$ being the total length of the tape and $L(n)$ being either the length already used or the residual length of the tape, where n is an integer and $1 \leq n \leq N$. In an approximation, the N calculated ratios $K(n)$ are approximated by an at least quadratic function in dependence on n and the total playing time is determined from a constant A in the function $(K(n)=X+A \cdot n+B \cdot n^2+ \ldots )$ thus obtained.

20 Claims, 7 Drawing Sheets

DEVICE FOR DETERMINING THE TOTAL PLAYING OF A TAPE

BACKGROUND OF THE INVENTION

1. Field of the Invention

The invention relates to a method of and a device for determining the type of a cassette in a magnetic-tape recording and/or reproducing apparatus, for example, a video recorder of the helical-scan type, so as to enable the total playing time of a tape accommodated in the cassette to be determined.

It is to be noted here that the invention is not only of interest for video recorders of the helical-scan type, but is suitable in magnetic-tape recording and/or reproducing apparatuses in general, i.e. also those of the linear type.

2. Description of the Related Art

A method of and a device for determining the type of a cassette inserted in a video recorder is known, for example from DE-PS 30 49 296. In that case, the sum of revolution times of the take-up spool and the supply spool of the inserted cassette is measured to determine the cassette type, so that the total playing time, the residual playing time and the playing time of the tape already used can be calculated.

In addition, EP 580,253 A2 (PHD 92-092) and the corresponding U.S. patent application Ser. No. 08/96,581, filed Jul. 21, 1993 disclose a method and a device in which two measurements are performed to determine the total playing time, where, in a first measurement, the tape is wound briefly in a threaded-out condition and, in a second measurement, the tape is moved into a threaded-in condition. In the two measurements, the number of pulses produced by the reel discs, which are coupled to the take-up reel and the supply reel of a cassette inserted into an apparatus, are used to determine the total playing time of the tape.

SUMMARY OF THE INVENTION

It is an object of the invention to reduce the inaccuracy in determining the total playing time of the tape and to provide a total playing time measurement which enables the tape length, and hence the playing time of the tape, to be determined independently of whether the thickness of the tape is known.

To this end a method of determining the total playing time of a magnetic tape accommodated in a cassette in a magnetic-tape recording and/or reproducing apparatus, the tape being moved between a tape spool coupled to a first reel disc and a tape spool coupled to a second reel disc, at least two measurements being carried out to determine the total playing time of the magnetic tape, is characterized in that first of all, a first measurement is carried out while the tape is moved with a known tape speed, and the revolution times of the first and the second reel disc are measured in this first measurement and a parameter is derived which corresponds to the sum of the squares of the revolution times, and in that a cassette-specific constant is derived from this parameter and the known tape speed, in that in a second measurement, the revolution times of the first and the second reel discs are measured during N revolutions of one of the reel discs for each revolution of this reel disc, and for each revolution, a ratio $K(n)$ is calculated from the revolution times thus determined and the cassette-specific constant, each ratio $K(n)$ being proportional to $L(n)/L_t$ and $L_t$ being the total length of the tape and $L(n)$ being either the length already used or the residual length of the tape, where n is an integer and $1 \leq n \leq N$, in that in an approximation, the calculated ratios $K(n)$, are approximated to by an at least quadratic function in dependence on and the total playing time is determined from a constant A in the function ($K(n)=X+A \cdot n + B \cdot n^2 + \ldots$) thus obtained.

Thus, the first measurement is performed with known tape speed. In general, this means that the first measurement is performed at the normal reproduction speed.

The essential feature resides in the second measurement. If required, the tape speed during the second measurement may also be the normal reproduction speed. However, the second measurement is preferably carried out at a higher speed in order to minimize the time required for the second measurement. Since the ratio K is calculated for N successive revolutions and these N values for K are approximated to by an at least quadratic function in dependence upon n, the total playing time can be determined very accurately without the thickness of the tape being known.

BRIEF DESCRIPTION OF THE DRAWINGS

Exemplary embodiments of the invention will be described in more detail by means of the following description with reference to the Figures. In the Figures.

DESCRIPTION OF THE PREFERRED EMBODIMENTS

The description with reference to the FIGS. is mainly based on the use of the invention in video recorders of the helical-scan type. However, as stated hereinbefore, the field of use is not limited to video recorders and the method in accordance with the invention can also be used in linear recorders for recording and/or reproducing audio and/or video signals in tracks which extend in the longitudinal direction of the tape.

Figure 1:
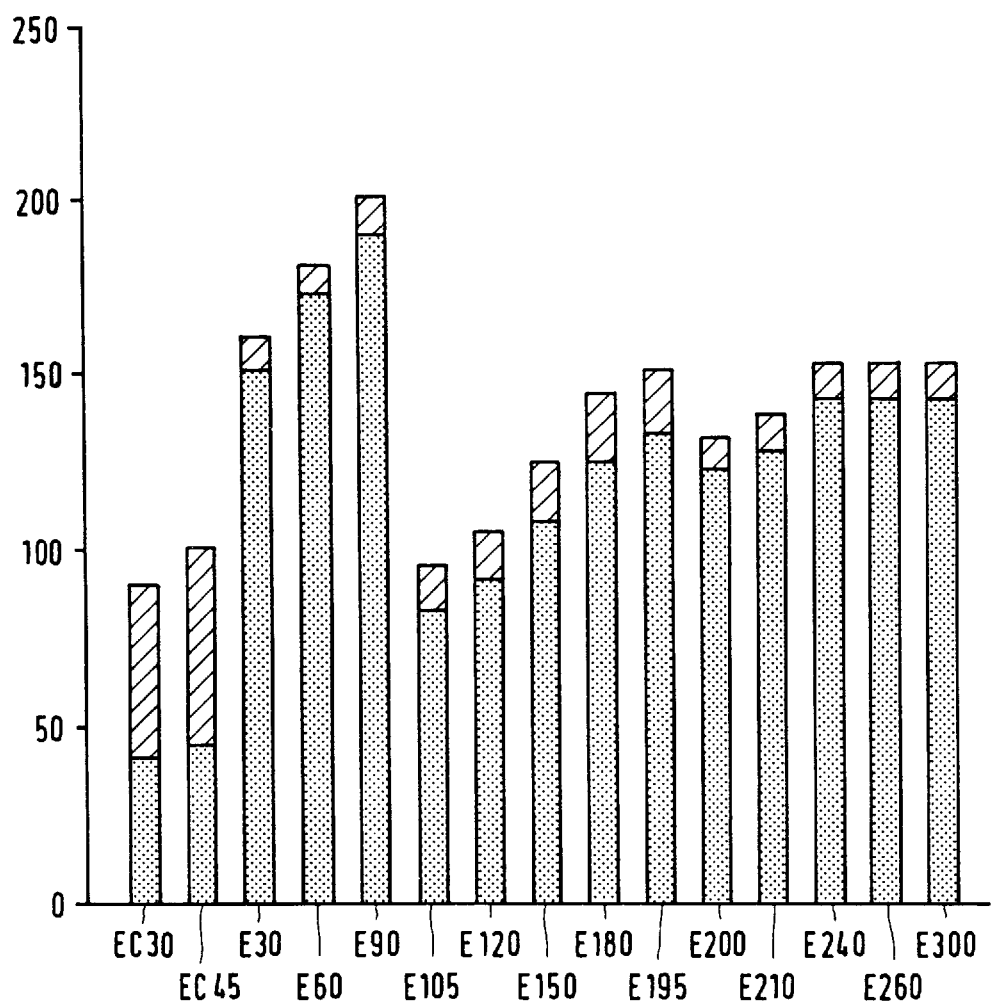
FIG. 1 gives values for the sum of the squares of the revolution times of the reel discs at the standard reproduction speed of the tape for different cassette types.

FIG. 1 gives, for different types of video cassettes, the values for the parameter $T_l^2+T_r^2$, i.e., the sum of the squares of the revolution times of the left-hand and the right-hand reel discs of a video recorder at a tape speed in the reproduction or "play" mode. The hatched areas for the different cassette types indicate the variation ranges of the parameter $T_l^2+T_r^2$. EC30 and EC45 relate to VHS-C cassettes in an adapter, with a total playing time of 30 and 45 minutes, respectively. The cassettes E30, E60 and E90 are cassettes with larger hubs (hub radius approximately 31 mm) and the other cassette types, starting from E105, are cassettes with smaller hubs (hub radius approximately 13 mm).

FIG. 1 shows that a detection of the type cassette type based on the calculation of $T_l^2+T_r^2$ does not yield unambiguous results because the hatched variation areas for the parameters $T_l^2+T_r^2$ for different cassette types overlap one another in many cases. For the EC30 and EC45 cassettes, this overlapping is caused by the use of adapters. In the other cases, overlapping is mainly caused by tolerances in tape thickness.

A reliable determination of the cassette type merely on the basis of the calculation of $T_l^2+T_r^2$ is therefore not possible.

The method in accordance with the invention for determining the cassette type and hence the total playing time of the cassette is based on the following derivation.

First of all, the following quantities are defined:

$R_l$ radius of the tape spool on the left-hand reel disc (supply reel disc), $R_r$ radius of the tape spool on the right-hand reel disc (take-up reel disc), V the tape speed, D the tape thickness, $L_t$ the total tape length, $L_u$ the tape length already used, $L_r$ the residual length of the tape, i.e., the tape length still available, $T_t$ the playing time already used, $T_o$ the residual playing time, i.e., the playing time still available, $T_l$ the revolution time of the left-hand reel disc, $T_r$ the revolution time of the right-hand reel disc, $R_o$ the hub radius of both reel discs.

The following are some basic relationships:

$$L_t \cdot D = R_l^2 \cdot \pi + R_r^2 \cdot \pi - 2 \cdot R_o^2 \cdot \pi \quad (1)$$

$$V = 2 \cdot \pi \cdot R_l / T_l = 2 \cdot \pi \cdot R_r / T_r \quad (2)$$

$$L_u = (R_r^2 \cdot \pi - R_o^2 \cdot \pi)/D = L_t - L_r \quad (3)$$

$$L_r = (R_l^2 \cdot \pi - R_o^2 \cdot \pi)/D = L_t - L_u \quad (4)$$

It is possible to derive from these formulas a cassette-specific parameter $\beta$, which complies with:

$$\beta = V^2 \cdot (T_l^2 + T_r^2)/4 \cdot R_o^2 \cdot \pi \quad (5)$$

In a first measurement operation, during which the tape is driven with a known constant tape speed, this parameter $\beta$ is calculated.

In a threaded-in condition, when the tape pressure roller cooperates with the capstan and the tape is driven, the tape speed V is known, for example, in that pulses, occurring within a given fixed time interval and supplied by a tachogenerator which cooperates with the capstan, are counted. Furthermore, the revolution times of the two reel discs can be measured, for example, by counting pulses supplied by tachogenerators which cooperate with the reel discs and occurring within a given fixed time interval, or by counting clock pulses with a given time spacing, which occur within the revolution time of each reel disc.

When it is now assumed that a cassette with a small hub has been inserted, the parameter $\beta$ can be calculated by means of the formula (5). In addition, the value for the revolution time of the left-hand reel disc or the right-hand reel disc is stored, because this value is required for the evaluation of a second measurement, as will be explained hereinafter.

For the second measurement, a ratio $K_u$ or $K_r$ can be derived from the above formulas, which ratio complies with:

$$K_u = T_u/T_t = \{T_l^2 \cdot \beta - (T_l^2 + T_r^2)\}/(\beta - 2)(T_l^2 + T_r^2), \quad (6)$$

$$K_r = T_o/T_t = \{T_r^2 \cdot \beta - (T_l^2 + T_r^2)\}/(\beta - 2)(T_l^2 + T_r^2). \quad (7),$$

respectively, where $0 \leq K_u, K_r \leq 1$ and $K_u + K_r = 1$.

Figure 2:
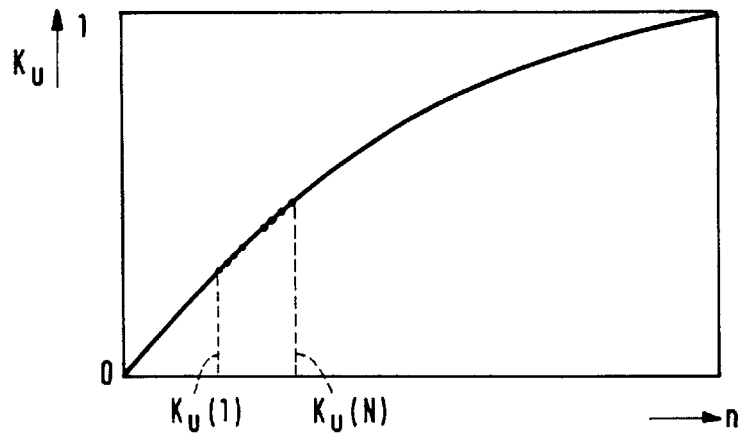
FIG. 2 shows how a ratio $K_u$ varies.

FIG. 2 shows how $K_u$ and, indirectly, also $K_r$ vary in general as a function of the number U of revolutions of a reel disc.

In the present example, the tape is driven in a half or fully threaded-out condition during a second measurement operation. The tape is then preferably driven in a direction towards the middle of the tape. This direction can be determined already in the first measurement operation, namely by determining the speeds of rotation of the two reel discs. The tape is preferably driven in a direction towards the middle of the tape because this ensures that the beginning of the tape or the end of the tape will not be reached during the second measurement. In the second measurement operation the tape speed is not relevant because the formulas (6) and (7) are independent of the tape speed.

In the second measurement operation the revolution times $T_l$ and $T_r$ of the two reel discs are measured during N revolutions of one of the reel discs, preferably the reel disc which rotates more slowly, i.e., the reel disc coupled to the reel carrying the largest spool of tape in the case of cassettes without adapter, during each revolution of this reel disc. If N revolutions of the left-hand reel disc are used in the second measurement operation, the revolution time $T_l$ will be stored beforehand in the first measurement operation. If N revolutions of the right-hand reel disc are used in the second measurement operation the revolution time $T_r$ will be stored beforehand in the first measurement operation.

It is now assumed that in the second measurement operation, the ratio $k_u$ for each of these N revolutions of this reel disc is calculated. Thus, N values $K_u(n)$ are calculated, where n is an integer which complies with: $1 \leq n \leq N$. These N values for $K_u$ have been represented diagrammatically in FIG. 2. The N values for $K_u$ should be situated on a parabola, i.e., on a curve which corresponds to at least a quadratic function. However, as result of influences, of measurement techniques or other influences this is not the case with the individual measurements for $K_u$, for which reason at least some of the N values deviate slightly from the path of the parabola.

For this reason, an at least quadratic function representing the parabola is derived from the measured values for $K_u$ which at least partly deviates slightly from the path of a parabola, which is effected by means of an approximation method, for example, the least-squares method.

Thus, an approximation step is carried out. In this approximation step, the N values for $K_u$ are approximated by a function $K(n)$. This function is dependent on n and is at least a quadratic function of n. This means that:

$$K(n) = X + A \cdot n + B \cdot n^2 + \ldots \quad (8)$$

where X, A and B are constants.

In general, it suffices to approximate to the values for $K_u$ by a quadratic function.

The constants A and V should then be calculated in the approximation step. However, it is particularly the constant A which matters. It can be established that in a first approximation, the constant A complies with:

$$A = 2 \pi \cdot R/L_r. \quad (9)$$

It is assumed that during the second measurement, N revolutions of the left-hand (right-hand) reel disc are measured and R is the radius of the tape spool carried by the left-hand (right-hand) reel disc at the beginning of the second measurement.

This means that:

$$L_t = 2\pi \cdot R/A, \text{ or } T_t = (R/V) \cdot 2\pi/A. \tag{10}$$

The radius of the left-hand (right-hand) reel disc at the beginning of the second measurement obviously corresponds to the radius of the left-hand (right-hand) reel disc during the first measurement. The first measurement also complies with:

$$R/V = T_l \text{ (or } T_r). \tag{}$$

Thus, R/V is equal to the revolution time of the left-hand (right-hand) reel disc in the first measurement. This revolution time has been measured in the first measurement and therefore it can now be used for the calculation of the total playing time of the tape by means of the formula (10), so that the cassette type has thus been detected.

Since the total playing time as well as either $K_u$ or $K_r$ are known it is also possible to calculate the playing time already used and the residual playing time by simply multiplying the total playing time by $K_u$ and $K_r$ (or $1-K_u$).

It has been found that the total playing time thus calculated is very accurate and enables a very reliable detection of the cassette type to be performed. The calculation of the constant A can be achieved by means of a recursive approximation to the tape length. Since recursive approximation methods are well-known from the literature, these methods will not be described herein.

It is to be noted that the above described detection method does not function to determine the total playing time of a VHS-C cassette in an adapter. In principle, this is not very important because such adapters are mainly used for playing back a camcorder recording, where the residual playing time is not interesting. Moreover, the above method is not capable of distinguishing between VHS-C cassettes in adapters and cassette types E105 and E120. This is because the variation ranges for these VHS-C cassettes, as indicated in FIG. 1, largely if not wholly overlap the variation ranges of the parameters $T_l^2 + T_r^2$ of the cassettes E105 and E120. This problem may arise when it is found, in the first measurement, that the sum $T_l^2 + T_r^2$ is below a value of, for example, 110, see FIG. 1.

This distinction is particularly important for the fast winding mode in order to preclude tape damage at the beginning or end of the tape.

In order to solve this problem of distinguishing between these cassette types the following is to be noted and proposed. Tests have shown that the value of $T_l^2 + T_r^2$ for VHS-C cassettes in adapters is equal to the lower limit of the variation range at the beginning of a the tape, increases during tape transport towards the end of the tape, and reaches the upper limit of the variation range at the end of the tape.

Thus, it appears that in the first measurement operation, when the tape is at its beginning, i.e., before the middle of the tape, a reliable distinction can be made between VHS-C cassettes and the types E105 and E120. Indeed, it is possible to select a threshold value, for example, equal to the mid value of the variation range of the VHS-C cassettes. The values of $T_l^2 + T_r^2$ for VHS-C cassettes are then always below this threshold value and for the cassette types E105 and E120, they are always above this threshold value.

Thus, it is possible to detect whether the tape is at its beginning, i.e., mainly at the supply reel disc, by comparison of the reel-disc tacho-pulses.

Thus, if it is detected that the tape is at its beginning in the first measurement operation and it is furthermore established that the value of the sum of the squares exceeds the threshold value, the second measurement operation can be performed in order to detect whether the cassette of the type E105 or E120. If the sum is below the threshold value, the cassette will be of the VHS-C type. The fast winding mode is then inhibited.

If the tape is near the tape end, distinction on the basis of the sum of the squares of the revolution times is not possible. Thus, if a value above the threshold value is calculated for this sum in the first measurement operation, the tape must be rewound towards the middle of the tape.If the value of the sum does not change significantly, so that the value remains above the threshold value, the cassette is not of the VHS-C type and the second measurement operation may be carried out. However, if the sum decreases to such an extent that it comes below the threshold value, the cassette will be a VHS-C cassette. The fast winding mode is then inhibited.

It is to be noted that the above steps of determining whether a cassette is a VHS-C cassette and of deciding whether fast winding is allowed can be used both separately and in conjunction with the method of determining the cassette type.

In the description of the first method, it has been assumed that a cassette with a small hub has been inserted. However, if, in accordance with the standard, a cassette of the types E30, E60 and E90 has been inserted, this will be a cassette with a large hub. FIG. 1 shows that the variation ranges for the sum of the squares of the revolution times for the types E60 and E90 do not overlap the other variation ranges. Thus, if in the first measurement a value for $T_l^2 + T_r^2$ is calculated which exceeds a threshold value of, for example, 160 (see FIG. 1), the cassette will be of a type with a large hub, and in the calculation of the parameter β in accordance with formula (5), the value for the large hub (31 mm) will be chosen for $R_O$.

FIG. 1 also shows that the variation range of the cassette type E30 partly overlaps the variation ranges of the types E240, E260 and E300. Thus, if, during the first measurement, a value for the sum of the squares is calculated which is in the range between approximately 140 to 160, it cannot be established whether the cassette is of a type with a large hub or of a type with a small hub. In the first measurement, the parameter β is then calculated two times, i.e., one time for the small hub and one time for the large hub. In the second measurement, $K_u$ (or $K_r$) is also measured two times for at least one revolution, i.e., one time for the one value of β and one time for the other value of β. If now a K value larger than 1 or smaller than zero is obtained on the basis of a large hub, the conclusion may be drawn from this that the cassette is of a type with a small hub. The second measurement can then proceed on the basis of the correct hub diameter thus determined.

Figure 3:
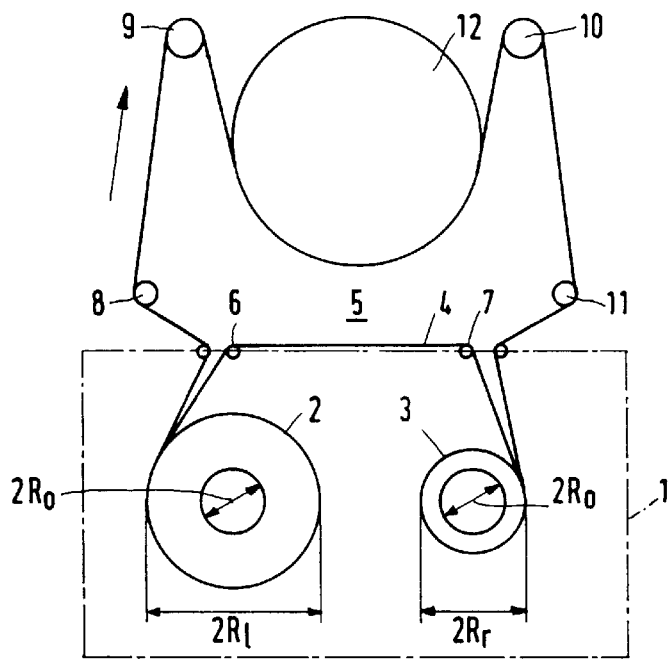
FIG. 3 shows, diagrammatically, a threading device for threading in and threading out a magnetic tape accommodated in a cassette.

In FIG. 3 the numeral 1 refers to a magnetic-tape cassette. The outline of the magnetic-tape cassette is shown diagrammatically as a dash-dot line. A supply reel 2 and a take-up reel 3 are rotatably supported in the magnetic-tape cassette 1. The spool diameter of the tape spool on the supply reel 2 is referenced $2R_l$, the spool diameter of the tape spool on the take-up reel 3 is referenced $2R_r$, and the hub diameter of both reels is $2R_O$. At the location of the cassette mouth 5, the magnetic tape 4 is guided by guide elements 6 and 7.

During a thread-in operation, tape-guide elements 8, 9, 10 and 11 engage behind the magnetic tape 4 at the location of the cassette mouth 5, and the magnetic tape 4 is extracted from the magnetic-tape cassette 1 and is wrapped partly around a drum-shaped scanning device 12. Such tape-threading devices are known per se (U.S. Pat. No. 4,807, 064) and therefore require no further explanation.

For the transport of the magnetic tape 4, both the supply reel 2 and the take-up reel 3 are, for example, each driven by a winding motor (not shown). The speeds of these winding motors are controlled by means of tacho pulses which are generated by sensing tacho discs. The tacho discs are locked in rotation to shafts of the winding motors.

Figure 4:
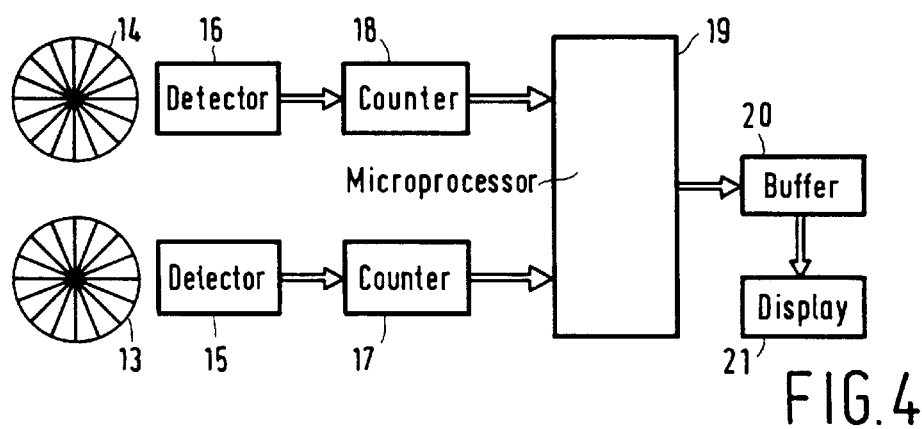
FIG. 4 shows a first embodiment of a device in accordance with the invention.

The block diagram in FIG. 4 shows, diagrammatically, two tacho discs 13 and 14 of drive motors for the supply reel 2 and the take-up reel 3. It is assumed that the tacho discs are configured to generate, for example, 400 tacho pulses per revolution by sensing by means of two detectors 15 and 16. The tacho pulses available at an output of the detector 15 are counted by a subsequent counter 17 and the tacho pulses available at an output of the detector 16 are counted by a subsequent counter 18. The counting results at the outputs of the two counters 17, 18 are applied to inputs of a microprocessor 19, which—as will be described in detail hereinafter—computes both the total playing time and the residual playing time of the magnetic tape 4 on the supply reel 2 and displays the results on a display device 21 after buffering in a memory 20.

Figure 5:
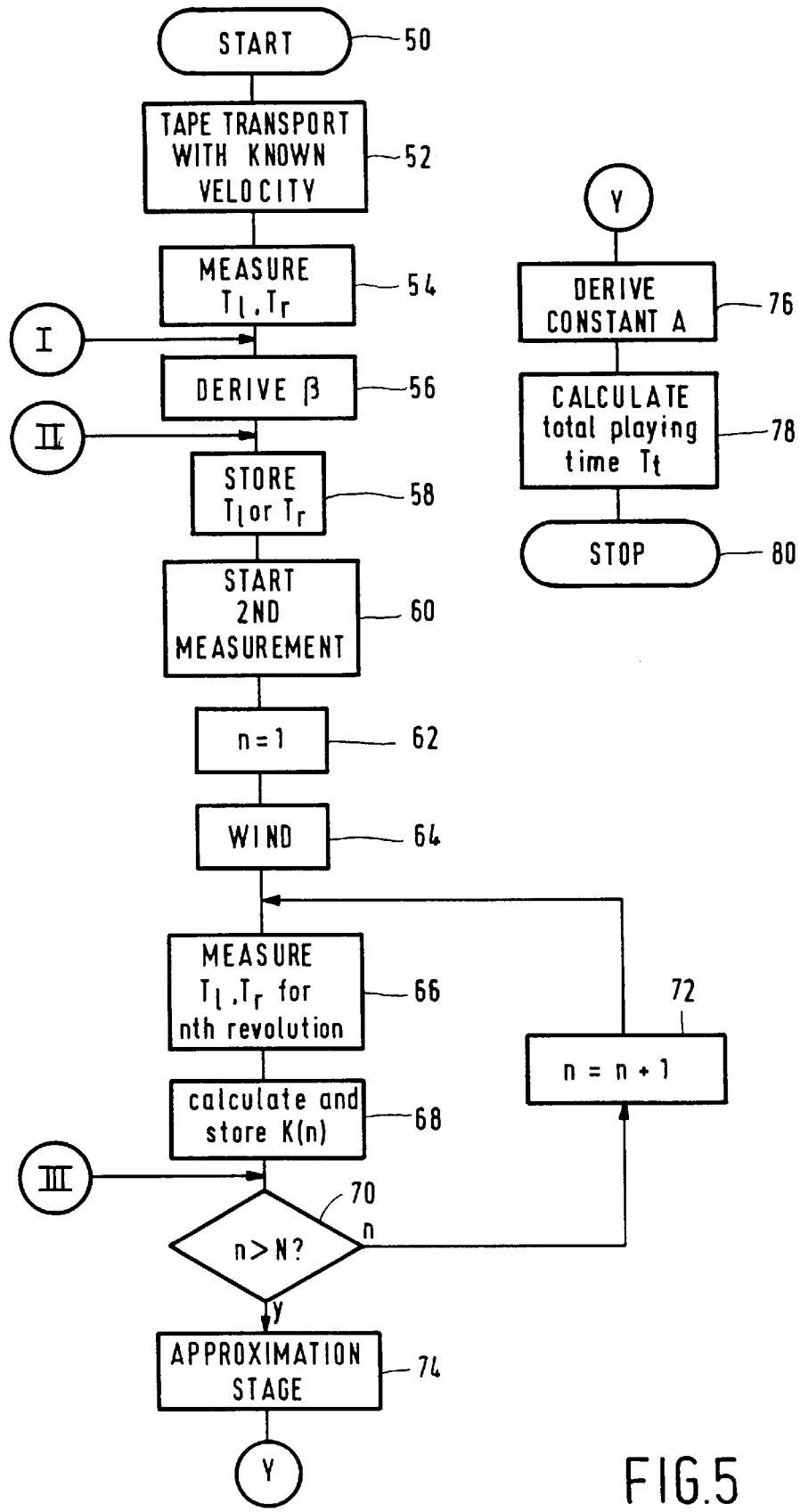
FIG. 5 shows a first embodiment of the method in accordance with the invention.

FIG. 5 is a flowchart of the method carried out by means of the device shown in FIG. 4.

The method begins in a block 50. The tape is threaded in and moved at the reproduction speed in a block 52. The tape speed is now known. The revolution times of the left-hand and right-hand reel discs $T_l$ and $T_r$ are measured in a block 54 and from these the value for β is calculated by means of formula (5) in a block 56. Either the value $T_l$ or the value $T_r$ is stored (see block 58), depending on whether N revolutions of the left-hand reel disc or the right-hand reel disc are used in the second measurement. At the beginning of the second measurement, the tape is returned into the cassette, see block 60. A variable n is set to 1 in a block 62 and the tape transport is switched to fast winding, see the block 64, preferably in a direction towards the middle of the tape.

In a block 66, the revolution times of the two reel discs are measured again and in a block 68, the ratio K(1) is calculated, for example, in accordance with the formula (6) or the formula (7), and is stored. This is repeated for N revolutions, see blocks 70 and 72. After the revolution times $T_l$ and $T_r$ have been measured for N revolutions of the left-hand and the right-hand reel discs, respectively, the N calculated ratios K(n) are approximated by a quadratic function in an approximation step, see block 74. Particularly, the value A for the factor of the member of the function which depends on n is then important, which value is derived in a block 76. As stated above, the total playing time $T_t$ of the tape can be calculated from this value, see block 78, and the cassette type has thus been established. If desired, the playing time used or the residual playing time of the tape can also be calculated. The method is stopped in a block 80.

The first measurement is represented by the blocks 52 to 58 and the second measurement is represented by the blocks 66 to 76.

The paths issuing from I, II and III will now be described in conjunction with FIGS. 6 and 7.

Figure 6:
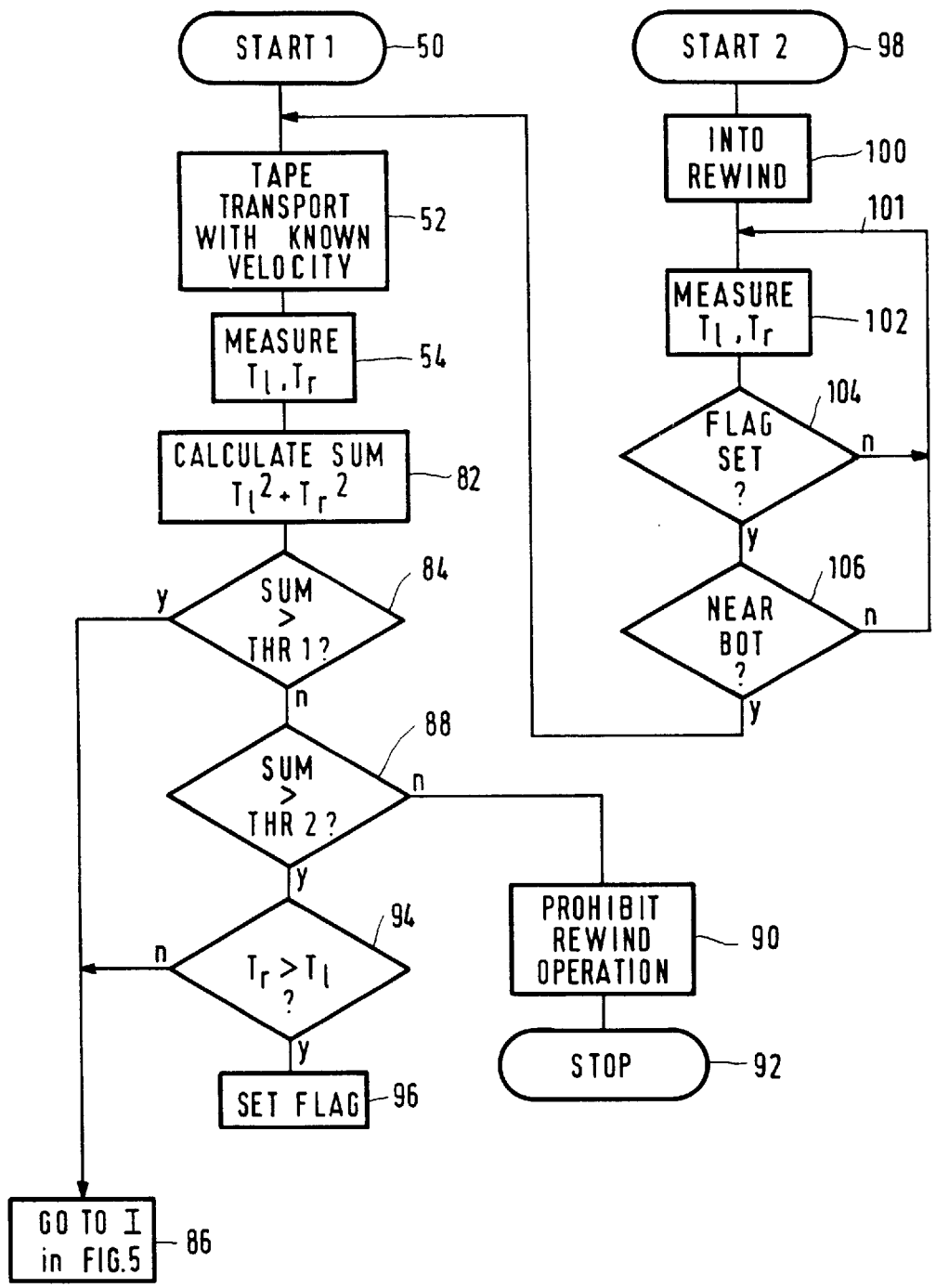
FIG. 6 shows a modification of the method in FIG. 5, for determining whether it concerns a VHS-C cassette.

FIG. 6 represents a method of determining whether the cassette is a VHS-C cassette in an adapter. The method starts in the blocks 50. The steps in blocks 52 and 54 in FIG. 5 are now carried out again. The sum of the squares of the revolution times is calculated in a block 82. This block is shown explicitly in FIG. 6. It is obvious that this block is also included in FIG. 5, namely in block 56 in this Figure. Subsequently, it is determined, in a block 84, whether the sum exceeds a first threshold value THR1. In accordance with the table in FIG. 1, this threshold value THR1 is, for example, approximately 110. If this value is exceeded, this means that it cannot be a VHS-C cassette. The method then proceeds via a block 86. In this block 86, it is, for example, possible to allow rewinding, because it is certain that the cassette cannot be of the VHS-C type. Another possibility is to switch over the method in accordance with FIG. 5 in order to detect the cassette type. The method then proceeds with the step in block 56 in FIG. 5.

If the sum is smaller than THR1, the method continues in a block 88. In the block 88, it is ascertained whether the sum exceeds a threshold value THR2. This threshold value THR2 is, for example, approximately 75 in the table in FIG. 1. If this value is not exceeded, this means that the cassette is of the VHS-C type. The method then proceeds in a block 90, where rewinding may be inhibited and/or an indication may be given that the cassette is of the VHS-C type. The method then stops in a block 92. If the value of the sum exceeds the second threshold value THR2, the method is continued in a block 94 where the revolution times $T_l$ and $T_r$ are compared with one another. If $T_r$ is smaller than $T_l$ the cassette cannot be a VHS-C cassette but a cassette of either the E105 or E120 type. The method proceeds with the block 86.

If $T_r$ is larger than $T_l$, the cassette is of the VHS-C type and a flag is set, see the block 96. It is again possible to indicate on a display that the cassette is of the VHS-C type. Moreover, the tape transport may be switched off.

As already explained above, the fact that the sum is larger than THR2 and that $T_r$ is larger than $T_l$ means that the tape is in a position beyond the middle of the tape. Therefore, rewinding is allowed. Thus, if a second branch of the method is carried out in a block 98, where a user, for example, sets the apparatus to fast rewinding, see block 100, the revolution times $T_l$ and $T_r$ are measured again in a block 102. In a block 104, it is detected whether the flag has been set. If this is not the case, the method proceeds in accordance with the branch 101. If the flag has been set, it is ascertained whether the tape is in the proximity of its beginning. This can be determined, for example, by a comparison of $T_l$ with $T_r$. If the tape is at its beginning, the method proceeds with block 52. Since the tape is now at its beginning, the comparison in block 88 will yield a negative result, so that fast rewinding is inhibited, block 90. It is to be noted once more that the steps in accordance with FIG. 6 may also be carried out separately.

Figure 7A:
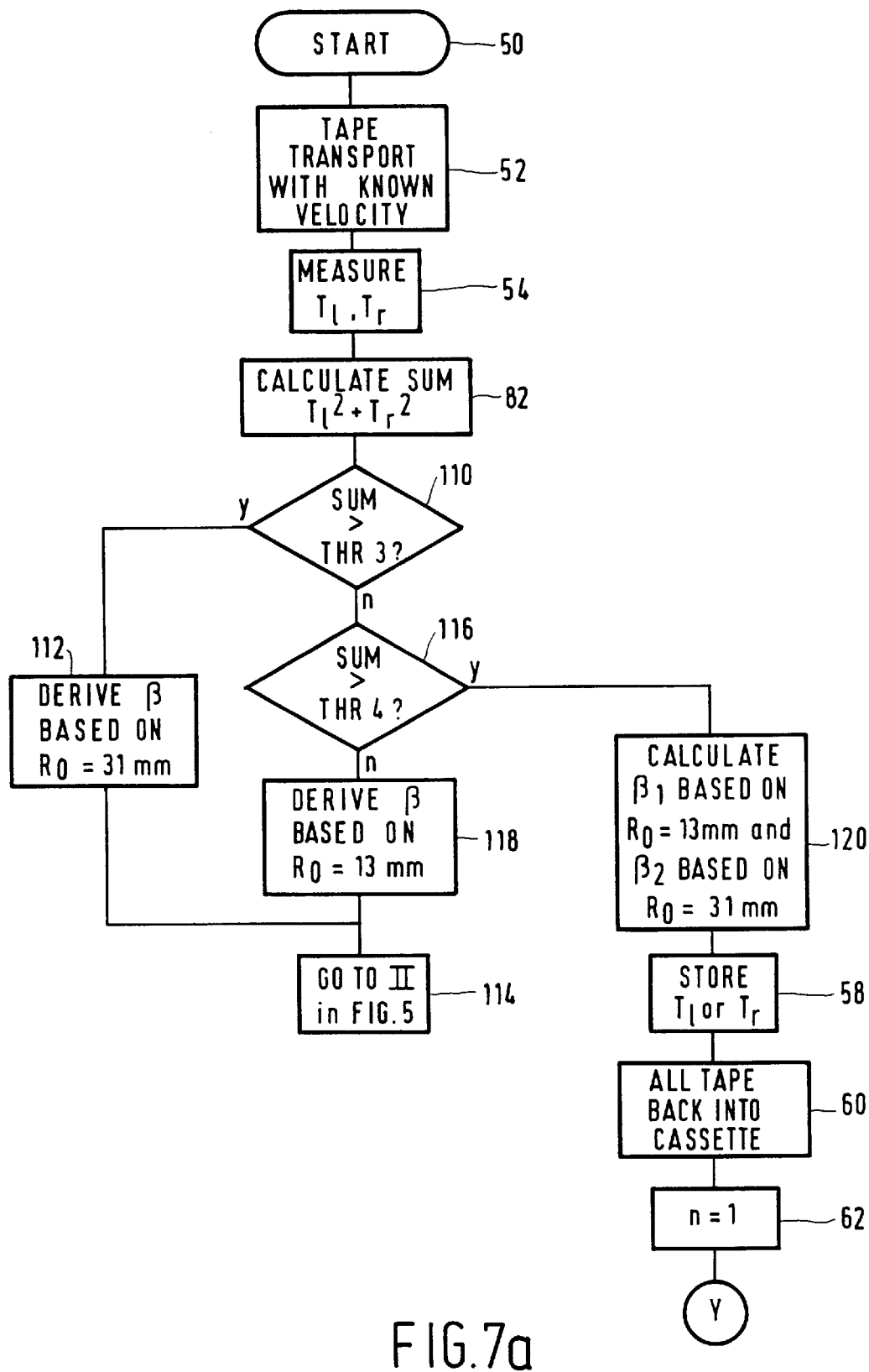
FIGS. 7a and 7b show another modification of the method in FIG. 5, for determining whether it concerns a cassette with a large hub diameter.
Figure 7B:
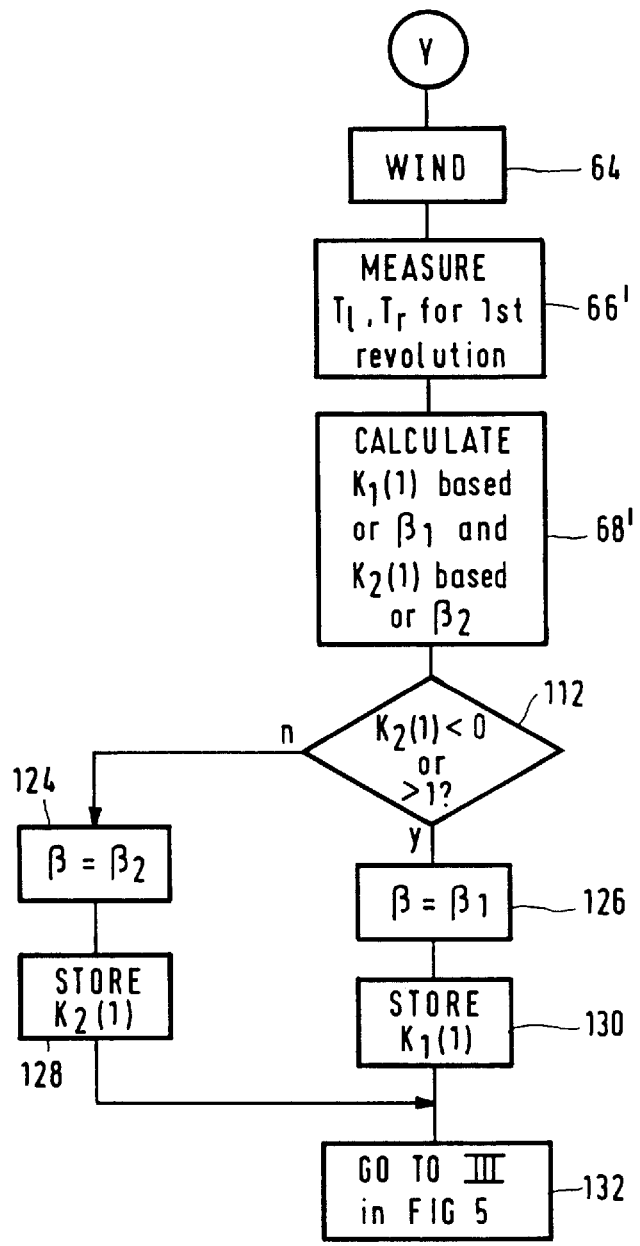

FIGS. 7a and 7b show an extension of the method in order to determine whether the cassette is a cassette with large hubs. The method again starts in block 50 in FIG. 7a. Also in this case, the steps in blocks 52 and 54 of FIG. 5 are carried out. The sum of the squares of the revolution times is calculated again in block 82. Subsequently, it is determined in a block 110 whether the sum is larger than a third threshold value THR3. In the table shown in FIG. 1, this threshold value THR1 is approximately 175. If the sum is larger, this means that the cassette can only be of the E60 or E90 type with large hubs. The method now proceeds with a block 112. The calculation of the value β is based on R. equal to 31 mm and the method continues with a block 114, proceeding with the method in accordance with FIG. 5 from step 58.

If the sum is not larger, the method proceeds with a block 116. In block 116, it is determined whether the sum is larger than a fourth threshold value THR4. In the table in FIG. 1, this threshold value THR4 is, for example, approximately 140. If this threshold value is not exceeded, this means that the cassette is of as type with small hubs. The method then proceeds with a block 118. The value for β is calculated on the basis of Ro equal to 13 mm and the method proceeds with block 114. If the value of the sum is larger than the fourth threshold value THR4, the method is continued in a block 120. Now two values for β are calculated, i.e., a first value $β_1$ based on $R_o$ being 13 mm and a second value $β_2$ based on $R_o$ being 31 mm. The value for $T_l$ or $T_r$ is again stored in block 58 in exactly the same way as in block 58 in FIG. 5.

The steps in the blocks 60, 62 and 64 start the second measurement, in exactly the same way as in FIG. 5. In block 66', in FIG. 7b the revolution times for the first revolution are measured again, and in block 68', a first value for K(1), i.e., $K_1(1)$, based on $β_1$ and a second value for K(1), i.e., $K_2(1)$, based on $β_2$ are calculated.

In a block 122, it is determined whether $K_2(1)$ is smaller than 1 or larger than zero. If this is not the case, this means that the cassette is of a type with large hubs. The method then proceeds with a block 124. Now β is assumed to be equal to $β_2$, $K_2(1)$ is stored as the value for K(1), see block 128, and the method proceeds with a block 132, with the step 70 in FIG. 5. In the case of a positive result in block 122, this indicates a cassette a with small hubs. The method then proceeds in a block 126. Now β is assumed to be equal to $β_1$, $K_1(1)$ is stored as the value for K(1), see block 130, and the method proceeds in block 132, with the step 70 in FIG. 5.

Figure 8:
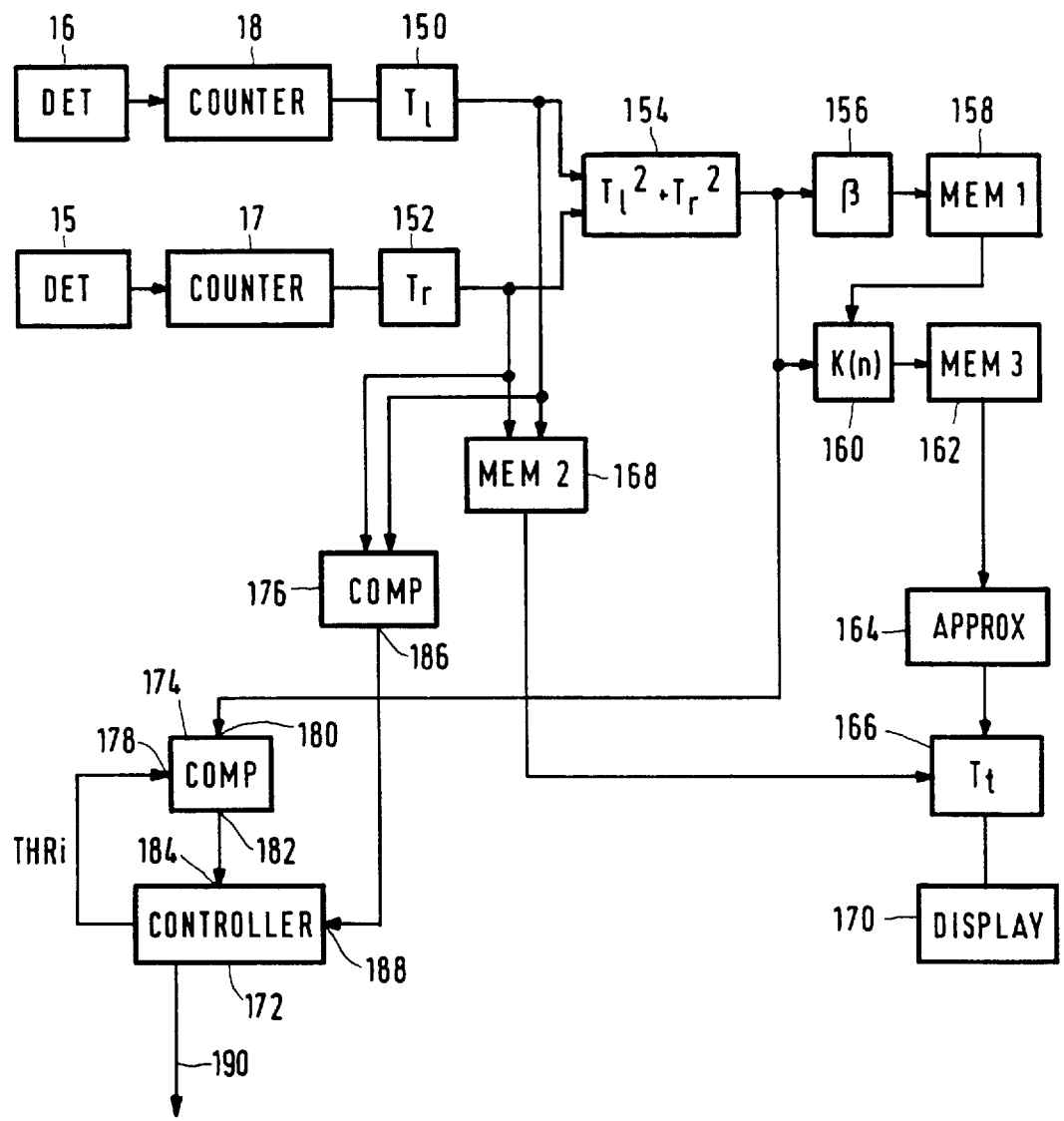
FIG. 8 shows the embodiment of the device in FIG. 4 in detailed form.

FIG. 8 shows a more detailed embodiment of the device in FIG. 4.

Outputs of the counters 18 and 17 of FIG. 4 are coupled to inputs of two units 150 and 152, respectively. These two units are constructed to determine the revolution times $T_l$ and $T_r$, respectively, of the two reel discs. A unit 154 calculates the sum of the squares of the revolution times from the applied values for $T_l$ and $T_r$. From this sum, the value for β is calculated in a unit 156 and is subsequently stored in a memory 158. The unit 156 is capable of calculating a first value for β based on the value for the small hub as well as a second value for β based on the value for the large hub, namely, in the case that the method described with reference to FIGS. 7a and 7b takes this path. The unit 158 is then likewise capable of storing these two values for β.

Subsequently, in the second measurement operation, the N values for K(n) are calculated in a unit 160 on the basis of the sum of the squares determined for each revolution of N revolutions of the one reel disc and of the value determined for β, and are stored in a memory 162. After this, the approximation. is performed in an approximation unit 164 and the value for A is derived therefrom. Subsequently, the total playing time $T_t$ is calculated in a unit 166. For this, one of the values $T_l$ or $T_r$ of the first measurement operation is required. To this end, this value has been stored in a memory 168 in the first measurement operation. The total playing time is then displayed on a display device 170.

To control the measurement operations in accordance with FIGS. 5, 6, 7a, and 7b a control unit 172 and two comparators 174 and 176 have been provided. In the comparator 174, the sum of the squares, which is applied to an input 180, is compared with the first to the fourth threshold values, referenced THRi, where i varies from 1 to 4. These threshold values have been stored in the control unit 172 and are applied to an input 178 of the comparator 174, when the blocks 84, 88 and 104 are carried out in the method of FIG. 6, and when the blocks 110 and 116 are carried out in the method of FIGS. 7a and 7b. The comparator 174 produces a control signal at an output 182 depending on the comparison result. This control signal is applied to an input 184 of the control unit 172. The method is further controlled by the control unit 172 on the basis of this control signal.

In the comparator 176, the revolution times are compared with one another to determine, in block 94 in FIG. 6, whether the tape is or is not in the proximity of the tape end. A control signal is produced at an output 186 and is applied to the control unit 172 for further controlling the method.

It is obvious that the control unit 172 generates further control signals (not shown), for example, to control the various elements in the device. The unit 172 generates, for example, control signals for the memories 158 and 162 to control the storage of the one or two values for β and to control the storage of the values for K(n). In addition, the unit generates control signals 190 for controlling the motors for the reel discs and the capstan.

I claim:

1. A device for determining a total playing time of a magnetic tape accommodated in a cassette in a magnetic-tape recording and/or reproducing apparatus including:
   a first reel disc and a second reel disc coupled to two respective tape spools onto which the tape has been wound;
   means for moving the magnetic tape;
   means for measuring revolution times of the reel discs;
   the device comprising:
      means for carrying out a first measurement while the tape is moved with a known tape speed; and
      means for carrying out a second measurement; and
      wherein the means for carrying out the first measurement include:
         means for deriving a parameter which corresponds to the sum of the squares of the revolution times of the reel discs; and
         means for deriving a cassette-specific constant from this parameter and the known tape speed; and
      wherein the means for carrying out the second measurement include:
         means for deriving, during N revolutions of one of the reel discs for each revolution of this reel disc, a ratio K(n) from the reel-disc revolution times thus determined and the cassette-specific constant, each ratio K(n) being proportional to $L(n)/L_t$ and $L_t$ being the total length of the tape and L(n) being either the length already used or the residual length of the tape, where n is an integer and $1 \leq n \leq N$;
         approximation means for approximating the N ratios K(n) by an at least quadratic function in dependence on n; and
         means for determining the total playing time from a constant A in the function $(K(n)=X+A^*n+B^*n^2+ \ldots )$ thus obtained.

2. The device of claim 1, wherein the constant A is equal to the factor of the member in the function which depends on n.

3. The device of claim 1, wherein the means for carrying out the second measurement include means for measuring the revolution times of the first and the second reel discs during N revolutions of the reel disc which rotates more slowly for each revolution of this reel disc.

4. The device of claim 1, wherein the means for moving the tape winds the tape in a direction towards the middle of the tape during the second measurement.

5. The device of claim 1, wherein the device in addition comprises means for deriving the playing time already used or the residual playing time of the tape by multiplying the determined total playing time by K(n), which corresponds to $L(n)/L_t$.

6. The device of claim 1, wherein N is larger than 49.

7. The device of claim 6, wherein N is an odd number.

8. The device of claim 1, wherein to determine whether the inserted cassette is a cassette with hubs of comparatively small hub diameter or comparatively large hub diameter, the means for carrying out the first measurement includes:

comparator means for comparing the value of the sum of the squares of the revolution times with another threshold value, wherein the derivation means for deriving the cassette-specific constant uses a first value for the hub diameter of the hubs of the cassette when this sum is found to be at one side of the other threshold value in the range of values of the sum, and wherein the derivation means derives two cassette-specific constants for the first value of the hub diameter and for a second value of the hub diameter if the value of the sum is found to be at the other side of the other threshold value, the derivation means for deriving the ratio K(n) calculating the ratio K two times for at least one revolution in the second measurement, one calculation being for the one value of the cassette-specific constant and the other calculation being for the other value of the constant, wherein the means for carrying out the second measurement further includes comparator means for comparing the values of the two calculated cassette-specific constants with a value range, and the means for carrying out the second measurement uses the value of the cassette-specific constant relating to the comparatively small hubs for the second measurement if this value is within the range of values, and uses the value of the cassette-specific constant relating to the comparatively large hubs for the second measurement if this value is within the range of values.

9. A device for determining whether a cassette inserted into a magnetic-tape recording and/or reproducing apparatus is a cassette accommodated in a cassette adapter, the device comprising:

means for moving the magnetic tape between a tape spool coupled to a first reel disc and a tape spool coupled to a second reel disc;

means for measuring the revolution times of the first and the second reel disc and for deriving a parameter which corresponds to the sum of the squares of the revolution times;

first comparator means for comparing the value of the parameter with a first and a second threshold value, the first threshold value being larger than the second threshold value;

identification means for identifying the cassette as a cassette not accommodated in a cassette adapter if the value of the parameter is larger than the first threshold value, and for identifying the cassette as a cassette accommodated in a cassette adapter if the value of the parameter is smaller than the second threshold value; and second comparator means for comparing the two revolution times with one another and on the basis of this comparison determining if the cassette is accommodated or is not accommodated in a cassette adapter, and for setting a flag if it is accommodated in a cassette adapter.

10. The device of claim 9, wherein the means for measuring the revolution times include means to again measure the revolution times of the first and the second reel disc when the apparatus is set to rewinding, and detection means for detecting whether the flag has been set and, if this is the case, for detecting whether the tape has been moved beyond the middle of the tape and, if this is the case, for causing the measuring means to carry out another measurement.

11. The device of claim 9, wherein said device further comprises means for inhibiting fast winding if the value of the parameters is smaller than the second threshold value.

12. A device comprising:

means for carrying out a first measurement of each of two reel disks of a tape unit while a tape is moved with a known tape speed between the reels; and means for carrying out a second such measurement; and wherein the means for carrying out the first measurement include:

means for deriving a parameter which corresponds to the sum of the squares of the revolution times of the reel discs;

means for deriving a cassette-specific constant from this parameter and the known tape speed; and wherein the means for carrying out the second measurement include:

means for deriving, during N revolutions of one of the reel discs for each revolution of this reel disc, a ratio K(n) from the reel-disc revolution times thus determined and the cassette-specific constant, each ratio K(n) being proportional to $L(n)/L_t$ and $L_t$ being the total length of the tape and $L(n)$ being either the length already used or the residual length of the tape, where n is an integer and $1 \leq n \leq N$;

approximation means for approximating the N ratios K(n) by an at least quadratic function in dependence on n; and means for determining the total playing time from a constant A in the function $(K(n)=X+A^*n+B^*n^2+ \ldots)$ thus obtained; and means to activate the means for carrying out said first and second measurements, if the value of the parameter is found to be larger than the first threshold value.

13. A magnetic-tape recording and/or reproducing apparatus, comprising:

a first reel disc and a second reel disc coupled to two respective tape spools onto which the tape has been wound;

means for moving the magnetic tape;

means for measuring revolution times of the reel discs;

means for carrying out a first measurement while the tape is moved with a known tape speed; and means for carrying out a second measurement;

and wherein the means for carrying out the first measurement include:

means for deriving a parameter which corresponds to the sum of the squares of the revolution times of the reel discs; and means for deriving a cassette-specific constant from this parameter and the known tape speed; and wherein the means for carrying out the second measurement include:

means for deriving, during N revolutions of one of the reel discs for each revolution of this reel disc, a ratio K(n) from the reel-disc revolution times thus determined and the cassette-specific constant, each ratio K(n) being proportional to $L(n)/L_t$ and $L_t$ being the total length of the tape and $L(n)$ being either the length already used or the residual length of the tape, where n is an integer and $1 \leq n \leq N$;

approximation means for approximating the N ratios $K(n)$ by an at least quadratic function in dependence on n; and means for determining the total playing time from a constant A in the function $(K(n)=X+A*n+B*n^2+ \ldots)$ thus obtained.

14. A device for determining a total playing time of a magnetic tape accommodated in a cassette in a magnetic-tape recording and/or reproducing apparatus, the magnetic-tape recording and/or reproducing apparatus having first and second reel discs coupled to two tape spools onto which the tape has been wound, a transport mechanism that moves the magnetic tape, the device comprising:

a first timing mechanism, associated with the reel discs, the first timing mechanism generating a first signal representative of the times of revolution of the reel discs while the tape is transported at a known tape speed;

a first derivation mechanism, coupled to the first timing mechanism, the first derivation mechanism receiving the first signal and deriving therefrom a parameter which corresponds to the sum of the squares of the times of revolution of the reel discs and a cassette-specific constant from said parameter and the known tape speed;

a second timing mechanism means, associated with the reel discs, the second timing mechanism generating a second signal representative of the times of revolution of the reel discs while the tape is transported;

a second derivation mechanism, coupled to the second timing mechanism, the second derivation mechanism receiving the second signal and deriving therefrom, during N revolutions of one of the reel discs for each revolution of this reel disc, ratios $K(n)$ from the reel-disc times of revolution thus generated and the cassette-specific constant, each ratio $K(n)$ being proportional to $L(n)/L_t$, $L_t$ being the total length of the tape and $L(n)$ being either the length already used or the residual length of the tape, where n is an integer and $1 \leq n \leq N$; and an analysis mechanism coupled to the second derivation mechanism, the analysis mechanism approximating the N ratios $K(n)$ by an at least quadratic function in dependence on n and determining the total playing time from a constant A in the function $(K(n)=X+A*n+B*n^2+ \ldots)$ thus obtained.

15. The device of claim 14, wherein the constant A is equal to the factor of the member in the function which depends on n.

16. The device of claim 14, wherein the second timing mechanism includes means for measuring the revolution times of the first and the second reel discs during N revolutions of the reel disc which rotates more slowly for each revolution of the reel discs.

17. The device of claim 14, wherein the transport mechanism transports the tape in a direction towards the middle of the tape during generation of the second signal.

18. The device of claim 14, further comprising means for deriving the playing time already used or the residual playing time of the tape by multiplying the determined total playing time by $K(n)$, which corresponds to $L(n)/L_t$.

19. The device of claim 14, wherein N is larger than 49.

20. The device of claim 14, wherein the cassette has hubs and wherein:

so as to determine whether the cassette has hubs of comparatively small or large hub diameter, the first timing mechanism includes comparator means for comparing the value of the sum of the squares of the revolution times with a first threshold value;

the first derivation mechanism: (I) uses a first value for the hub diameter of the hubs If said sum is found to be at one side of a second threshold value in the range of values of the sum; and (ii) derives two cassette-specific constants for the first value of the hub diameter and for a second value of the hub diameter if the said sum is found to be at the other side of the second threshold value;

the second derivation mechanism derives the ratio $K(n)$ by calculating the ratio K two times for at least one revolution in the second measurement, one calculation being for the one value of the cassette-specific constant and the other calculation being for the other value of the cassette-specific constant; and the second timing mechanism includes comparator means for comparing the values of the two calculated cassette-specific constants with a value range, and uses the value of the cassette-specific constant relating to the comparatively small hubs for the second measurement if this value is within the range of values, and uses the value of the cassette-specific constant relating to the comparatively large hubs for the second measurement if this value is within the range of values.

* * * * *